United States Patent [19]

Knoll

[11] 4,127,795

[45] Nov. 28, 1978

[54] LAMP BALLAST CIRCUIT

[75] Inventor: William C. Knoll, Turbotville, Pa.

[73] Assignee: GTE Sylvania Incorporated, Stamford, Conn.

[21] Appl. No.: 826,051

[22] Filed: Aug. 19, 1977

[51] Int. Cl.[2] .................... H05B 41/36; H02M 5/458

[52] U.S. Cl. .................................. 315/210; 315/205; 315/209 R; 315/224; 315/DIG. 4; 315/DIG. 5; 315/DIG. 7; 315/255; 363/37; 363/101

[58] Field of Search .......................... 363/37, 101, 19; 315/209 R, 219, 223, 224, 247, 205, 210, 255, DIG. 7, DIG. 5, DIG. 4

[56] References Cited

U.S. PATENT DOCUMENTS

| | | | |
|---|---|---|---|
| 3,008,068 | 11/1961 | Wilting et al. | 315/206 |
| 3,611,021 | 10/1971 | Wallace | 315/239 |
| 3,723,848 | 3/1973 | Miller | 331/113 A X |
| 3,754,160 | 8/1973 | Jensen | 315/257 X |
| 3,758,841 | 9/1973 | Bourbeau | 331/113 A X |
| 3,889,153 | 6/1975 | Pierce | 315/209 R |
| 4,045,711 | 8/1977 | Pitel | 315/209 R |
| 4,075,476 | 2/1978 | Pitel | 315/209 R |

*Primary Examiner*—Alfred E. Smith
*Assistant Examiner*—Charles F. Roberts
*Attorney, Agent, or Firm*—Thomas H. Buffton

[57] ABSTRACT

A highly efficient tuned oscillator ballast circuit especially suitable for a fluorescent lamp load includes an oscillator circuit coupled to a pulsed DC potential source and having a tuned output circuit coupled to a load circuit, to a drive circuit for the oscillator which is dependent upon current flow in the load circuit and to a rectifier and charge storage and isolation and applying network coupled to the pulsed DC potential source and providing energy thereto whenever the potential decreases below a given reference level. A transient compensating circuit to protect the oscillator components from initial or "start up" transients is also included.

19 Claims, 2 Drawing Figures

LAMP BALLAST CIRCUIT

CROSS-REFERENCE TO OTHER APPLICATIONS

An application entitled "Tuned Oscillator Ballast Circuit" filed Mar. 19, 1976 in the name of Ira Jay Pitel, bearing U.S. Ser. No. 668,485 now U.S. Pat. No. 4,045,711, and assigned to the assignee of the present invention is directed to an oscillator and power factor correction circuitry. An application entitled "Sinusoidal Wave Oscillator Ballast Circuit" bearing U.S. Ser. No. 752,167, filed Dec. 20, 1976 now U.S. Pat. No. 4,075,476, in the name of Ira Jay Pitel and assigned to the assignee of the present application includes enhanced transistor "storage time" compensating circuitry. Another pending application entitled "High Power Factor Conversion Circuitry" bearing U.S. Ser. No. 793,875, filed May 4, 1977 in the name of William C. Knoll, an inventor in the present application, and assigned to the assignee of the present application includes a feedback potential storage capability.

BACKGROUND OF THE INVENTION

This invention relates to highly efficient ballast circuit especially suitable for use with fluorescent lamp loads and more particularly to tuned oscillator ballast circuitry employing feedback from the load circuitry for driving the oscillator circuitry.

Presently, auto-transformer type ballasts are commonly employed for fluorescent lamp systems. Such apparatus is known to be undesirably heavy and cumbersome as compared with electronic forms of ballasts. Also, it is known that such apparatus is relatively inefficient, generates undesired heat, is undesirably wasteful of energy, and operates at a frequency (60Hz) which is undesirably in the audible range.

Another popular form of ballast circuitry employs a flip-flop oscillator and a saturable core transformer. Core saturation characteristics are utilized to limit current flow which is difficult to control and accurately predict. Thus, such apparatus tends to lack the reliability desired in such equipment.

Another form of ballast circuitry, set forth in a copending application assigned to the assignee of the present invention, provides a sinusoidal oscillator circuit which includes circuitry to compensate for "storage time" of the transistors of the oscillator circuit. Even though such circuitry has enhanced capabilities, as compared with prior known apparatus, it has been found that improved efficiency is possible without undue increase in cost.

A further form of ballast circuit, set forth in a copending application assigned to the assignee of the present application provides a storage capability whereby the pulsed DC potential applied to a tuned oscillator is altered to provide application of a substantially constant DC potential to a lamp load. However, it has been found that such circuitry leaves something to be desired with respect to sudden changes in loading. Thus, added protection capabilities would be highly desirable.

OBJECTS AND SUMMARY OF THE INVENTION

An object of the present invention is to eliminate or at least greatly reduce the above-mentioned difficulties of the prior art. Another object of the invention is to provide a ballast circuit with enhanced self-protective capabilities. Still another object of the invention is to improve the reliability of a ballast circuit for a lamp load. A further object of the invention is to provide ballast circuitry having load removal and initial "start-up" component protection capabilities.

These and other objects, advantages and capabilities are achieved in one aspect of the invention by a tuned oscillator ballast circuit wherein a pulsed DC development circuit is coupled to an AC source and to a tuned oscillator which is, in turn, coupled to a load energizing circuit connected to a load and to a drive circuit for the oscillator. A rectifier circuit connected to the load energizing circuit feeds back a potential to a charge storage and isolating and applying circuit shunting the pulsed DC development circuit whereby a substantially constant DC potential is applied to the oscillator and the oscillator is driven by current flow in the load circuit.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
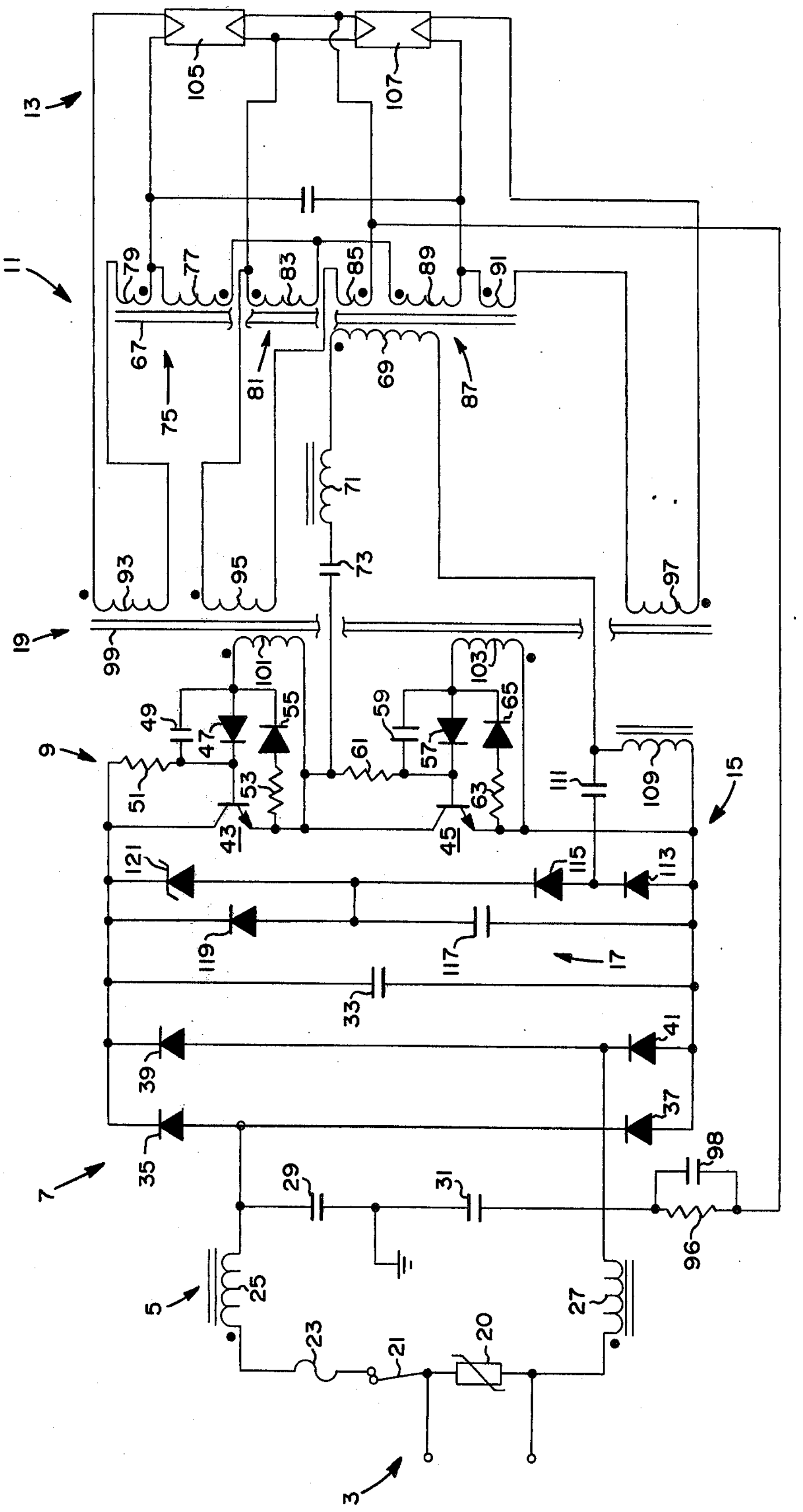
FIG. 1 is one embodiment of a high efficiency tuned oscillator ballast circuit.

Referring to FIG. 1 of the drawings, a high efficiency tuned oscillator ballast circuit includes an AC source of potential 3 coupled by way of a power line conditioner circuit 5 to a pulsed DC potential source 7. A tuned oscillator 9 couples the pulsed DC potential source 7 to a load circuit energizing circuit 11 which is, in turn coupled to the load circuit 13. A rectifier circuit 15 is coupled to the energizing circuit 11 and to an energy storage and isolating and applying circuit 17 shunting the pulsed DC potential source 7. A drive circuit 19 is coupled to the energizing circuit 11 and to the tuned oscillator 9 for providing drive potentials for the tuned oscillator 9.

More specifically, the power line conditioner circuit 5 includes a transient suppressor 20 shunted across the AC potential source 3 with a series connected switch 21, fuse 23 and a first inductor 25 coupling one side of the AC potential source 3 to the pulsed DC potential source 7. The other side of the AC potential source 3 is coupled by a second inductor 27 to the pulsed DC potential source 7. A first capacitor 29 couples the first inductor 25 to circuit ground and a second capacitor 31 couples the second inductor 27 to circuit ground. Also, a capacitor 33 shunts the pulsed DC potential source 7 and in association with the power line conditioner circuit 5 provides power factor correction for the circuitry as set forth in the above-mentioned U.S. Pat. No. 4,075,476.

The pulsed DC potential source 7 includes a diode bridge configuration having the junction of a first and second diode, 35 and 37 respectively coupled to the first inductor 25 and first capacitor 29 and the junction of a third and fourth diode, 39 and 41 respectively coupled to the second inductor 27 and second capacitor 31 of the power line conditioner circuit 5. Thus, the pulsed DC potential source 7 is coupled by way of the power line conditioner circuit 5 to the AC potential source 3.

The tuned oscillator 9 includes first and second series connected transistors 43 and 45 shunted across the pulsed DC potential source 7. A bias network in the form of a parallel connected diode 47 and capacitor 49 is coupled to the base and by way of a resistor 51 to the collector of the first transistor 43. Also, a transistor switching assistance circuit includes a resistor 53 and diode 55 is coupled to the emitter and base of the first transistor 43. A second bias network includes a parallel connected diode 57 and capacitor 59 coupled to the base and by way of a resistor 61 to the collector of the second transistor 45. A transistor switching assistance circuit includes a resistor 63 and a diode 65 series connecting the emitter to the base of the second transistor 45.

The load energizing circuit 11 includes a transformer 67 having a primary winding 69 coupled by a series connected inductor 71 and capacitor 73 to the junction of the emitter of the first transistor 43 and the collector of the second transistor 45 of the tuned oscillator 9 and to the rectifier circuit 15. The transformer 67 includes a first secondary winding 75 including a series connected drive winding 77 and filament winding 79; a second secondary winding 81 having a series connected drive winding 83 and filament winding 85, and a third secondary winding 87 having a series connected drive winding 89 and filament winding 91. The first, second and third secondary windings 75, 81 and 87 are connected to first, second and third primary windings 93, 95 and 97 respectively of a transformer 99 of the drive circuit 19 and, in turn, to the load circuit 13. Also, a ground return for voltage at the load 13 and an assistance to starting is provided by the parallel connected resistor 96 and capacitor 98.

The first, second and third primary windings 93, 95 and 97 of the transformer 99 of the drive circuit 19 are coupled to first and second secondary windings 101 and 103 which are connected to and provide drive potentials for the first and second transistors 43 and 45 of the tuned oscillator 9. Moreover, the load circuit 13 includes a pair of fluorescent lamps 105 and 107 each coupled to the first, second and third secondary windings 75, 81 and 87 of the transformer 67.

Also, coupled to the primary winding 69 of the transformer 67 of the energizing circuit 11 is the rectifier circuit 15. This rectifier circuit 15 includes an alterable inductive winding 109 series connecting the primary winding 69 to a potential reference level and a capacitor 111 coupling the winding 109 to the junction of series connected first and second diodes 113 and 115.

The diode 115 of the rectifier circuit 15 is coupled to the junction of a capacitor 117 and a diode 119 of the energy storage and isolating and applying circuit 17 shunting the pulsed DC potential source 7. Moreover, a transient protector in the form of a zener diode 121 is connected to the junction of the capacitor 117 and diode 119 of the energy storage and isolating and applying circuit 17, to the diode 115 of the rectifier circuit 15 and to the pulsed DC potential source 7.

Figure 2:
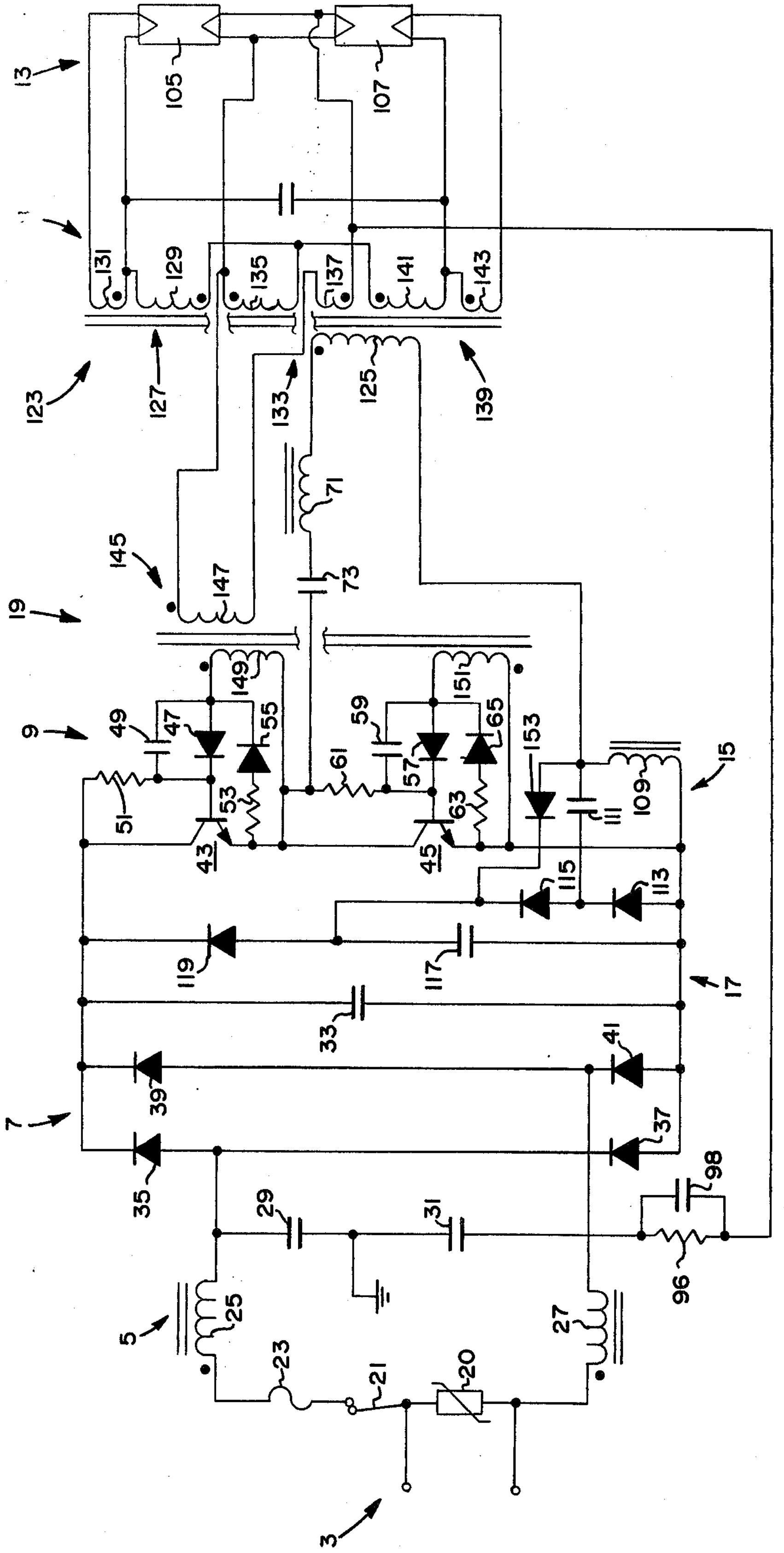
FIG. 2 is an alternate embodiment of a high efficiency tuned oscillator ballast circuit having reduced complexity.

An alternate embodiment of the tuned oscillator ballast circuit of FIG. 1 is illustrated in FIG. 2. Therein, substantially similar components bear the same numerals as found in FIG. 1 with the exception of the energizing circuit 11 for the load 13, the drive circuit 19 and the transient protector 121 of FIG. 1.

In the alternate embodiment of FIG. 2, the energizing circuit 11 includes a transformer 123 having a primary winding 125 coupled by the series connected inductor 71 and capacitor 73 to the junction of the transistor 43 and 45 of the tuned oscillator 9. The primary winding 125 is also connected to circuit ground by way of the adjustable inductor 109 of the rectifier circuit 15.

The transformer 123 includes a first secondary winding 127 having a drive winding 129 in series connection with a filament winding 131; a second secondary winding 133 having a drive winding 135 in series connection with a filament winding 137; and a third secondary winding 139 having a drive winding 141 in series connection with a filament winding 143. However, the oscillator drive circuit 19 includes a transformer 145 having a single primary winding 147 in series connection with the second secondary winding 133 of the transformer 123. Moreover, the primary winding 147 is coupled to a first and second secondary winding 149 and 151 each coupled to one of the pair of transistors 43 and 45 of the tuned oscillator 9.

Also, the transient protector of the circuitry of FIG. 2 is in the form of a diode 153. This transient protector diode 153 is shunted across the rectifier circuit 15 and coupled to the energizing circuit 11 and the energy storage and selective isolating and applying circuit 17.

As to operation of the embodiment of FIG. 1, the power line conditioner 5 serves as both a transient filter and a radio frequency interference (RFI) filter as set forth in detail in the previously-mentioned U.S. Pat. No. 4,075,476. Briefly, the transient suppressor 20 "clips" undesired transient spikes or signals and also serves as a filter for the undesired but "clipped" signals. Moreover, the signals are further filtered by one of the first or second inductors 25 and 27. Also, the first and second inductors 25 and 27 in conjunction with the capacitor 29 and 31 serve as filters for inhibiting RFI signals appearing at the AC potential source 3.

As to operation of the tuned oscillator ballast circuit, an AC potential available at the AC potential source 3 is applied to the power line conditioner 5 whereat undesired transient and RFI signals are removed. Then, the relatively "clear" AC potential is applied to the pulsed DC potential source 7 wherein the AC potential is rectified to provide a 120Hz pulsating DC potential.

As will be explained hereinafter, this pulsating DC potential is altered to a relatively steady-state DC potential for application to the tuned oscillator 9. The tuned oscillator 9 has a series resonant circuit including the primary winding 69 of the transformer 67 of the load energizing circuit 11. This series resonant circuit has a resonant frequency of about 20 KHz and provides a low impedance path for current flow therethrough. As increased current flows through the primary winding 69, an increased current flow occurs in the first, second and third secondary windings 75, 81 and 87 which include the filament windings 79, 85 and 91 and the load drive windings 77, 83 and 89.

Importantly, the primary windings 93, 95 and 97 of the oscillator drive circuit 19 are in series with and also receive the increased current flow of the first, second and third secondary windings 75, 81 and 87. In turn, drive for the oscillator is increased by way of the secondary windings 101 and 103 which provide base drive for the first and second transistors 43 and 45 of the tuned oscillator.

Also, the increased current flow of the primary winding 69 of the load energizing circuit 11 is present in the series connected adjustable inductor 109. This increased current flow in the adjustable inductor 109 is rectified and, in this instance, doubled and applied to the capacitor 117 of the energy storage isolating and applying circuit 17. Therein, the capacitor 117 serves to store energy which is applied via the isolating diode 119 to the pulsed DC potential source 7 whenever the pulsed DC potential decreases below a given reference level. As a result, the potential applied to the oscillator 9 and available at the load circuit 13 is a substantially uniform DC potential. Thus, undesired "strobe" effects on the load circuit 13 are essentially eliminated. Moreover, the isolating diode 119 prevents energy from the rectifier circuit 15 from deleteriously affecting the power factor as seen at the pulsed DC potential source 7.

Additionally, it has been found that activation or "start-up" of the circuitry is accompanied by initial transient currents which are deleterious to and tend to destroy the transistor 43 and 45 of the tuned oscillator 9. It would appear that the undesired initial transient currents tend to "turn on" the transistor 43 and 45 at the same time creating a so-called "totem pole" effect wherein the potential source is essentially short-circuited by the transistors 43 and 45 resulting in excess current flow therethrough. However, it has been found that the inclusion of a transient protector, such as the zener diode 121 essentially eliminates the problem and permits the accumulation of an initial charge on the charge storage capacitor 117 of the energy storage isolating and applying circuit 17. Once having attained a charge on the charge storage capacitor, the transient protector, zener diode 121 in this instance, is for all practical purposes unessential to the circuitry operation.

It should be noted that the inductors 71 serve as a smoothing choke for undesired potential "spikes" and transients while the inductor 109 of the rectifier circuit 15 not only serves as a filtering choke but is also adjustable to permit control of the output potential applied to the load circuit 13. Thus, the adjustable inductor 109 may be utilized as a so-called "dimmer" control for a load circuit 13 whenever the load is in the form of lamps.

Further, each of the transistors 43 and 45 includes a switching assistance circuit in the form of a series connected resistor and diode 53 and 55 for transistor 43 and 63 and 65 for transistor 45. Also, the ground return circuit in the form of the parallel connected resistor 96 and capacitor 98 coupled to the load circuit 13 assist in initiation of current flow in the load circuit 13.

In the alternate embodiment of FIG. 2, the transformer 123 of the load energizing circuit 11 includes first, second and third secondary windings 127, 133 and 139. However, the series connected drive winding 135 and filament winding 137 of the second secondary winding 133 are series connected to a single primary winding 147 of the transformer 145 of the oscillator drive circuit 19. In turn, the single primary winding 147 is utilized with the secondary windings 149 and 151 associated with each of the transistors 43 and 45 respectively to provide base drive potentials.

Additionally, it is to be noted that the transient protector, in this instance, is in the form of a diode 153 shunting the rectifier circuit 15. Thus, initial transient potentials which would cause "totem-pole" currents in the first and second transistors 43 and 45 are by-passed via the low impedance path through the resonant circuit of the capacitor 73, inductor 71, primary winding 69 and diode 153 to effect charging of the charge storage device or capacitor 117. Moreover, having achieved a charge on the charge storage capacitor 117 the diode 153 is back biased to provide a high impedance path for currents from the second transistor 45 due to the negative potential at the juncture of the diode 153 and the inductor 109. As a result, the diode 153 or transient protector is, for all practical purposes, an inactive component once an initial charge on the storage capacitor 117 has been achieved. Also, it has been found that a relatively inexpensive diode 153 may be utilized as the transient protector in preference to a relatively expensive zener diode 121 of FIG. 1.

Thus, there has been provided a unique tuned oscillator ballast circuit having the capability of utilizing the current in the filament load circuit as a driving current for the tuned oscillator. In this manner, removal of the load, such as the removal of a lamp for example, caused a substantive reduction in drive current of the tuned oscillator. Thus, the oscillator is protected from deleteriously high currents upon failure or removal of the load therefrom.

Also, circuitry is provided for utilizing all of the filament windings, associated with a lamp load of two lamps, for providing drive for the oscillator or the utilization of a single filament winding in series with a single drive circuit winding to provide base drive for the oscillator. Obviously, employment of a single winding reduces the component costs as well as the complexity of the circuitry.

Further, the transient protector practically eliminates the intolerable problem of transistor component losses due to initial transients. Moreover, a circuit utilizing a relatively inexpensive component has been provided which also appears to enhance the protective capabilities of the protector circuitry.

While there has been shown and described what is at present considered the preferred embodiments of the invention, it will be obvious to those skilled in the art that various changes and modifications may be made therein without departing from the invention as defined by the appended claims.

What is claimed is:

1. A tuned oscillator ballast circuit comprising:
   - an AC potential source;
   - means coupled to said AC potential source for providing a pulsating DC potential;
   - means coupled to said means for providing a pulsating DC potential for providing a high frequency output potential;
   - means coupled to said means for providing a high frequency output potential for energizing a load circuit;
   - means coupled to said means for energizing a load circuit for driving said means for providing a high frequency output potential, whereby current flowing in said load circuit drives said means for providing a high frequency potential;
   - means coupled to said means for energizing a load circuit for rectifying said high frequency output potential; and
   - means coupled to said means for rectifying said high frequency output potential for storing energy and selectively isolating and applying said stored energy to said means for providing a pulsating DC potential whereby stored energy is provided whenever said pulsating DC potential decreases below a given DC potential reference level.

2. The tuned oscillator ballast circuit of claim 1 including means for compensating for transient currents coupled to said means for providing a pulsating DC potential and to said means for storing energy for selective isolation and application to said means for providing a pulsating DC potential.

3. The tuned oscillator ballast circuit of claim 2 wherein said means for compensating for transient currents is in the form of a zener diode.

4. The tuned oscillator ballast circuit of claim 1 wherein said means for providing a high frequency output potential includes an oscillator having a pair of series connected transistor shunting said means for providing a pulsating DC potential and a resonant circuit including a series connected capacitor and inductor coupled to said transistors to provide an output potential.

5. The tuned oscillator ballast circuit of claim 1 wherein said means for energizing a load circuit includes a first transformer having a primary winding coupled to said means for providing a high frequency output potential and a secondary winding coupled to said load circuit, said load circuit including a lamp having a filament and said secondary winding including a series connected drive winding and filament winding.

6. The tuned oscillator ballast circuit of claim 1 wherein said means for energizing a load circuit is in the form of a first transformer having a primary winding coupled to said means for providing a high frequency output potential and a secondary winding coupled to said load circuit with said means for driving said means for providing a high frequency output potential including a primary winding series connected to a secondary winding of said first transformer and a secondary winding coupled to said means for providing a high frequency output potential whereby interrupted current flow in said load circuit causes interrupted current flow in said means for driving said means for providing a high frequency output potential.

7. The tuned oscillator ballast circuit of claim 1 wherein said load circuit is in the form of a pair of fluorescent lamps and said means for energizing said load circuit includes a first transformer having a primary winding coupled to said means for providing a high frequency output potential and three secondary windings each including a series connected filament winding and a drive winding coupled to said pair of fluorescent lamps and said means for activating said means for providing a high frequency output potential includes a second transformer having at least one primary winding in series connection with at least one of said series connected filament and drive windings of said means for energizing said load circuit and at least one secondary winding coupled to said means for providing a high frequency output potential.

8. The tuned oscillator ballast circuit of claim 1 wherein said load circuit is in the form of a pair of lamps and said means for energizing said load circuit includes a first transformer having a primary winding coupled to said means for providing a high frequency output potential and three secondary windings each including a series connected filament and drive winding coupled to said pair of lamps and said means for activating said means for providing a high frequency output potential includes a second transformer having a primary winding in series with each one of said three secondary windings of said first transformer of said means for energizing said load circuit and a secondary winding coupled to each one of a pair of transistors of said means for providing a high frequency output potential.

9. The tuned oscillator ballast circuit of claim 1 wherein said means for rectifying said high frequency output potential is in the form of a voltage doubler having an inductor coupling said means for energizing said load circuit to a potential reference level, a series connected diode and capacitor shunting said inductor, and a diode coupling the junction of said series connected capacitor and diode to said means for storing and selectively isolating and applying said stored energy.

10. The tuned oscillator ballast circuit of claim 1 wherein said means for rectifying said high frequency output potential includes an inductor of selectable value coupling said means for energizing said load circuit to a potential reference level whereby the value of said inductor controls the power applied to said load circuit.

11. The tuned oscillator ballast circuit of claim 1 wherein said means for providing a high frequency output potential includes a pair of series connected transistors each having base and emitter electrodes and a switching assistance circuit coupled intermediate said base and emitter electrodes of each of said transistors.

12. The tuned oscillator ballast circuit of claim 11 wherein said switching assistance circuit is in the form of a series connected diode and resistor.

13. A tuned oscillator ballast circuit comprising:

an AC potential source;

a pulsed DC potential development circuit coupled to said AC potential source;

a tuned oscillator for providing a high frequency output potential coupled to said pulsed DC potential development circuit;

a load energizing circuit including a first transformer having a primary winding coupled to said tuned oscillator and a secondary winding coupled to a load circuit;

an oscillator drive circuit including a second transformer having a primary winding in series connection with said secondary winding of said first transformer and a secondary winding coupled to said tuned oscillator whereby drive for said tuned oscillator is dependent upon current flow in said load energizing circuit;

a rectifier circuit coupled to said load energizing circuit for developing a DC potential from said high frequency output potential; and a charge storage and selective isolating and applying circuit shunting said pulsed DC potential development circuit and coupled to said rectifier circuit, said circuit selectively providing a charge in response to a decrease in said pulsed DC potential below a given reference level whereby said load circuit is energized by a substantially constant DC potential.

14. The tuned oscillator ballast circuit of claim 13 including a transient current compensating means coupled to said rectifier circuit and to said charge storage and selective isolating and applying circuit for protecting said tuned oscillator from transient potentials occurring prior to establishment of a charge on said charge storage and selective isolating and applying circuit.

15. The tuned oscillator ballast circuit of claim 14 wherein said transient current compensating means is in the form of a zener diode coupled to said rectifier circuits and to said charge storage and selective isolating and applying circuit.

16. The tuned oscillator ballast circuit of claim 13 wherein said load energizing circuit includes a first transformer having a primary winding coupled to said tuned oscillator and three secondary windings each having a series connected filament and drive winding connected to said load and an oscillator drive circuit including a second transformer having at least one primary winding in series connection with at least one of said three secondary windings of said first transformer and at least one secondary winding coupled to said tuned oscillator to effect application of a drive potential thereto in accordance with current flow in said load energizing circuit.

17. The tuned oscillator ballast circuit of claim 13 wherein said load energizing circuit includes a first transformer having a primary winding coupled to said tuned oscillator and three secondary windings each including series connected filament and drive windings and said oscillator drive circuit having a second transformer with a primary winding in series connection with said filament and drive windings of each of said three secondary windings of said first transformer and a secondary winding coupled to each one of a pair of series connected transistors of said tuned oscillator.

18. The tuned oscillator ballast circuit of claim 13 wherein said rectifier circuit includes an alterable inductance coupling said load energizing circuit to a potential reference level whereby said alterable inductor provides selective adjustment of energy applied to said load circuit to control the intensity thereof.

19. The tuned oscillator ballast circuit of claim 13 wherein said tuned oscillator includes a pair of series connected transistors each having base and emitter electrodes and a switching assistance circuit is shunted across the base and emitter electrodes of each of said transistors.

* * * * *